United States Patent
Meunier et al.

(10) Patent No.: US 8,447,300 B2
(45) Date of Patent: May 21, 2013

(54) METHOD FOR SELECTING A CELL OF A NETWORK WHEN A WIRELESS COMMUNICATIONS DEVICE IS TURNED ON AND CORRESPONDING WIRELESS COMMUNICATIONS DEVICE

(75) Inventors: Laurent Meunier, Coulaines (FR); Sylviane Roullier, Le Mans (FR)

(73) Assignee: ST-Ericsson SA, Plan-les-Ouates (CH)

( * ) Notice: Subject to any disclaimer, the term of this patent is extended or adjusted under 35 U.S.C. 154(b) by 29 days.

(21) Appl. No.: 13/203,731

(22) PCT Filed: Mar. 2, 2010

(86) PCT No.: PCT/EP2010/052612
§ 371 (c)(1),
(2), (4) Date: Nov. 11, 2011

(87) PCT Pub. No.: WO2010/100141
PCT Pub. Date: Sep. 10, 2010

(65) Prior Publication Data
US 2012/0115472 A1 May 10, 2012

(30) Foreign Application Priority Data
Mar. 4, 2009 (FR) ...................................... 09 51377

(51) Int. Cl.
*H04W 4/00* (2009.01)
(52) U.S. Cl.
USPC ..................... 455/435.2; 455/435.3; 455/558; 455/434; 370/338
(58) Field of Classification Search
USPC ................. 370/310, 328, 329, 331, 332, 335, 370/338; 455/127.4, 432.1, 434, 435.1–435.3, 455/436–444, 515, 524, 525, 550.1, 552.1, 553.1, 558
See application file for complete search history.

(56) References Cited

U.S. PATENT DOCUMENTS

| | | | |
|---|---|---|---|
| 5,903,832 A * | 5/1999 | Seppanen et al. ........... | 455/435.3 |
| 6,799,038 B2 * | 9/2004 | Gopikanth .................. | 455/435.2 |
| 7,689,218 B2 * | 3/2010 | Jiang et al. ................. | 455/435.2 |
| 2006/0234705 A1 * | 10/2006 | Oommen .................... | 455/435.3 |

(Continued)

FOREIGN PATENT DOCUMENTS

| EP | 1740001 A | 1/2007 |
|---|---|---|
| EP | 1858278 A | 11/2007 |

(Continued)

OTHER PUBLICATIONS

International Search Report for PCT/EP2010/052612 mailed Mar. 29, 2010.

(Continued)

*Primary Examiner* — Mahendra Patel
(74) *Attorney, Agent, or Firm* — Potomac Patent Group PLLC

(57) ABSTRACT

Method for selecting a cell from a network when a wireless communications device is turned on, following a previous power down, comprising a process for obtaining (12) the current country code (CC) corresponding to the current location where the device is situated when it is switched on and, if the current country (CC) is different from the current country code (LCC) corresponding to the place where the device was located during the said previous power down, a search (14) for the possible presence of at least one set of parameters, stored in the device, associated with the said current country code and relating to a cellular environment having already allowed a network access, and, in the eventuality of such a presence, a selection (16) of the said cell using the set or sets of parameters as a first priority.

6 Claims, 2 Drawing Sheets

U.S. PATENT DOCUMENTS

Figure 1:
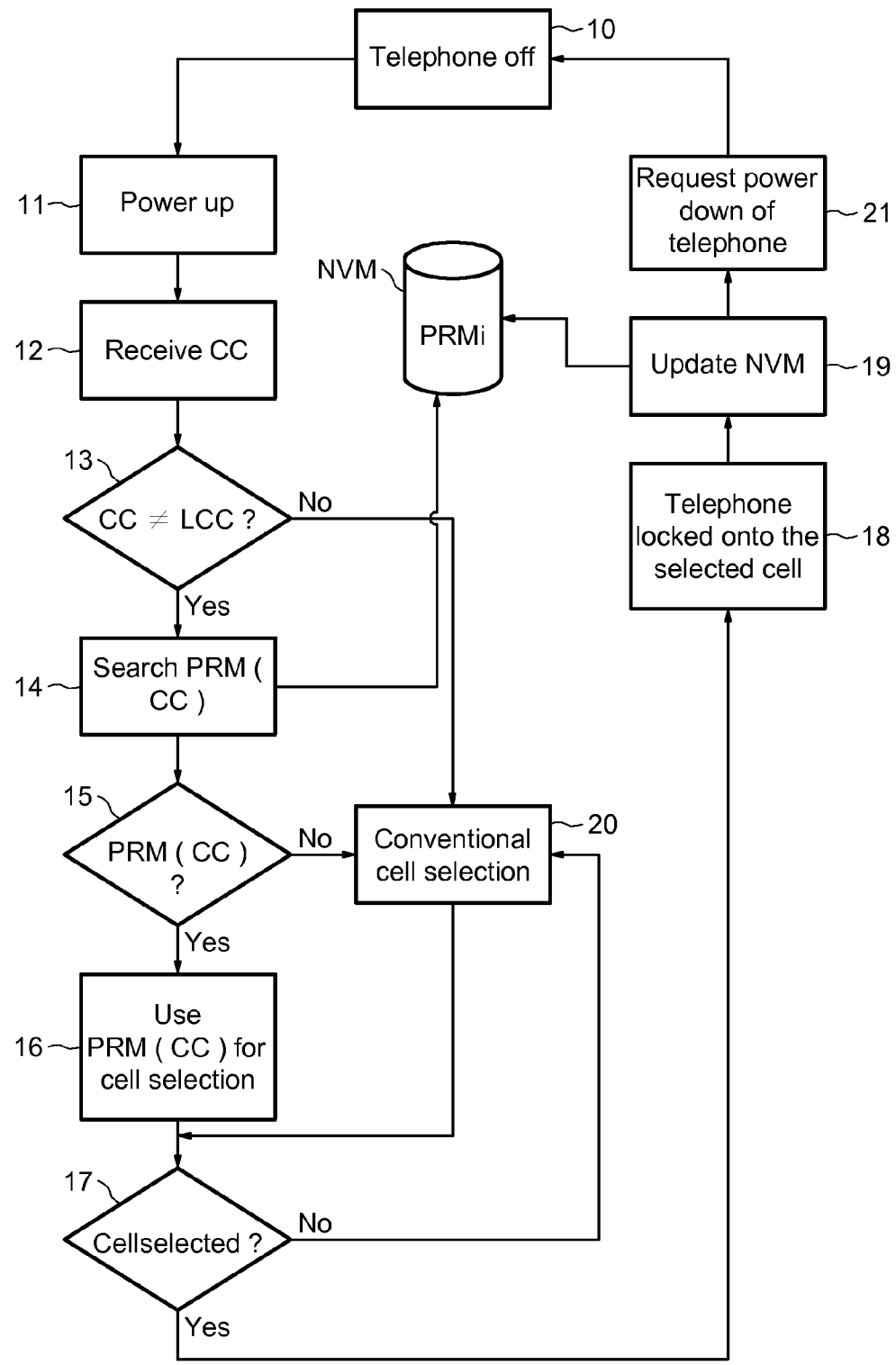

| | | | |
|---|---|---|---|
| 2006/0282554 A1 | 12/2006 | Jiang et al. | |
| 2008/0153486 A1* | 6/2008 | Ramkull et al. | 455/434 |
| 2008/0175209 A1* | 7/2008 | Abdel-Kader et al. | 370/338 |
| 2008/0259882 A1* | 10/2008 | Abdel-Kader et al. | 370/338 |
| 2009/0257645 A1* | 10/2009 | Chen et al. | 382/145 |

FOREIGN PATENT DOCUMENTS

| | | |
|---|---|---|
| EP | 1950987 A | 7/2008 |
| WO | 01/05174 A | 1/2001 |

OTHER PUBLICATIONS

3GPP, "Universal Mobile Telecommunications System (UMTS); User Equipment (UE) procedures in idle mode and procedures for cell reselection in connected mode (3GPP TS 25.304 version 8.3.0 Release 8)," ETSI TS 125 304, V8.3.0, Oct. 2008, Technical Specification, pp. 1-47.

3GPP, "LTE; Evolved Universal Terrestrial Radio Access (E-UTRA); User Equipment (UE) procedures in idle mode (3GPP TS 36.304 version 8.3.0 Release 8)," ETSI TS 136 304, V8.3.0, Nov. 2008, Technical Specification, pp. 1-30.

3GPP, "Digital cellular telecommunications system (Phase 2+); Functions related to Mobile Station (MS) in idle mode and group receive mode (3GPP TS 43.022 version 8.1.0 Release 8)," ETSI TS 143 022, V8.1.0, Jan. 2009, Technical Specification, pp. 1-26.

* cited by examiner

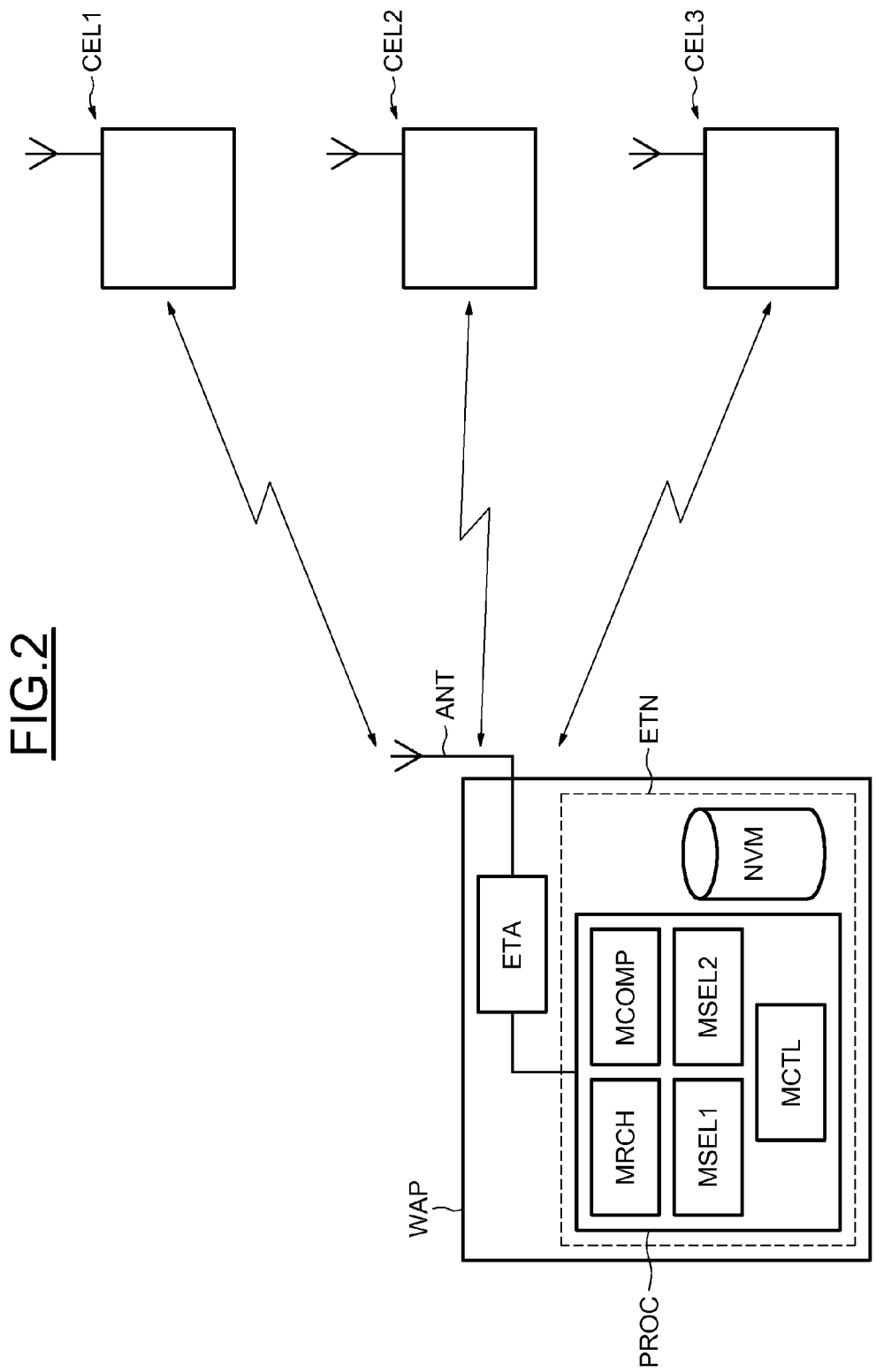

METHOD FOR SELECTING A CELL OF A NETWORK WHEN A WIRELESS COMMUNICATIONS DEVICE IS TURNED ON AND CORRESPONDING WIRELESS COMMUNICATIONS DEVICE

The invention relates to the field of wireless communications and, more particularly, the selection of a cell of a communications network in such a manner as to be able to establish a wireless communications channel between this cell and a wireless communications device, for example a cellular mobile telephone, and thus allow this telephone to access the network.

The invention is advantageously applicable to, but not limited to, equipment compatible with the 3GPP standards, for example the UMTS standards and/or LTE (Long Term Evolution) networks.

When a user takes a plane to fly to his destination, for example in a different country from the departure country, he is obliged to switch his telephone off. Then, having arrived at his destination, when he turns his telephone back on in order to try and connect to a network, it can be that the time required to establish a connection with the network is relatively long.

According to one embodiment of the invention, a method is thus provided for selecting a cell and a corresponding wireless communications device aimed at reducing, as far as possible, the time for establishing a connection when the telephone is turned on at the place of arrival.

According to one aspect, a method is provided for selecting a cell from a network when a wireless communications device is turned on, following a previous power down; this method comprises a process for obtaining the current country code corresponding to the current location where the device is situated when it is switched on and, if the current country code is different from the country code corresponding to the place where the device was located during the said previous power down, the method comprises a search for the possible presence of at least one set of parameters, stored in the device, associated with the said current country code and relating to a cellular environment having already allowed a network access, and, in the eventuality of such a presence, the method comprises a selection of the said cell using the set or sets of parameters as a first priority.

Thus, for example, when a user travels regularly from one country to another generally using the same airports, his time to connect upon arrival will be reduced since the telephone will have the characteristic parameters of a cell stored in memory that has already allowed access to the network for the telephone.

The method furthermore preferably comprises the storage in the device of the set of parameters relating to the said cell selected prior to the power down of the device.

This allows a kind of updating of the database of cell parameters of the telephone.

This storage occurs, for example, preferably as soon as the cell is selected, in other words when it is "correct" from a protocol point of view allowing the user to access all the services and not only emergency calls.

If the current country code is identical to the country code corresponding to the place where the device was located during the said previous power down, or if the use of the stored set or sets of parameters has not allowed the said cell to be selected, then a conventional cell search algorithm is preferably used to select the said cell.

According to another aspect, a wireless communications device is provided, comprising reception means configured for receiving the current country code corresponding to the current place where the device is located when it is turned on following a previous power down, storage means configured for potentially storing at least one set of parameters associated with the said current country code and relating to a cellular environment having already allowed a network access, search means capable to be activated and configured for searching in the storage means the possible presence of the set or sets of parameters, comparison means configured for comparing the current country code with the country code corresponding to the place where the device was located during the said previous power down, selection means configured for selecting a cell from a network using, as a first priority, the set or sets of parameters and control means configured for activating the search means if the result of the said comparison is positive and for activating the selection means.

According to one embodiment, the control means are also configured for storing in the storage means the set of parameters relating to the said cell selected prior to the power down of the device.

According to one embodiment, the device also comprises additional selection means capable to be activated and configured for selecting a cell with a conventional cell search algorithm, and the control means are configured for activating the additional selection means if the result of the said comparison is negative or if the activation of the selection means has not allowed the said cell to be selected.

Other advantages and features of the invention will become apparent upon examining the detailed description of non-limiting embodiments, and of the appended drawings, in which:

FIG. 1 illustrates schematically one embodiment of a method according to the invention, and FIG. 2 illustrates schematically one embodiment of a wireless communications device according to the invention.

In FIG. 2, the reference WAP denotes a wireless communications device, for example but not limited to, a cellular mobile telephone. This device WAP comprises an antenna ANT and is able to exchange data with a wireless communications network over a communications channel CH via a cell CELi.

In practice, a cell may be notably characterized by an identifier and a frequency emitted by a base station of the network.

Generally speaking, the telephone can lock onto a cell in order to access the network when this cell belongs to the Public Land Mobile Network (PLMN) used by the operator having given rights to the user of the telephone, in general via the SIM card inserted into the telephone.

Furthermore, each base station or radio transmitter continuously emits, over specific frequencies, information on the characteristics of the various cells, this information notably comprising an identifier of the cell associated with a frequency.

This identifier comprises several fields one of which contains a country code CC, corresponding to the country in which the said cell is located.

Referring now to FIG. 1, it is assumed in step 10 that the telephone is switched off.

When it is turned on (step 11), the processing means of the telephone will, conventionally and in a manner known per se, start to perform a scanning of the various frequencies of the various bands for frequencies capable of being supported by the telephone.

Accordingly, the telephone will be able to recover the country code CC transmitted within the identifiers of the cells (step 12).

Then, the current country code CC is compared with the country code LCC corresponding to the place where the device was located when it was switched off (step 13). This of course assumes that the country code LCC has been stored in a non-volatile memory NVM of the telephone prior to it being switched off, which is the case as will be seen in more detail hereinbelow.

If the current country code CC is different from the country code LCC, then a search is performed (step 14) for the possible presence of at least one set of parameters PRM(CC) stored in the device, for example in the non-volatile memory NVM, associated with the current country code CC and relating to a cellular environment having already allowed a network access.

In practice, this set of parameters PRM(CC), associated with the current country code CC, could for example comprise the identifier and the frequency of a cell onto which the telephone has already been locked during a prior access to the network.

If such a set of parameters PRM(CC) is present in the non-volatile memory NVM, then a cell will be selected by using, as a first priority, this set of parameters PRM(CC).

In other words, the processing means will attempt to directly lock onto the frequency indicated in this set of parameters and use the identifier of the corresponding cell in order to try and lock onto this cell.

If the selection turns out to be positive, then the process of selection of the cell will have been shorter than a conventional process of selection. By way of example, the gain in time can go from a few seconds to several minutes depending on the capabilities of the telephone (notably in terms of bands of frequencies supported) and the spectral configuration of the country in question.

If the search for the set of parameters PRM(CC) turns out to be unsuccessful, in other words, in practice, if there is no set of parameters relating to a cell stored in the memory NVM in association with the current country code CC, then a cell is selected by using a conventional selection algorithm well known to those skilled in the art (step 20).

Similarly, if the use of the set of parameters recorded in the memory NVM and used at the step 16 has not finally enabled a cell to be selected, for example because this cell was not operating at that time, a conventional cell selection is then also carried out (step 20).

A conventional cell selection is preferably used if the current country code CC received when the telephone is powered up is identical to the country code LCC when the telephone was switched off. Indeed, in this case, the information stored in the SIM or USIM card of the telephone will be sufficient.

As it is well known by the man skilled in the art a conventional cell search algorithm referred above is generally a standardized cell search process, for example the cell search process as defined by the standard ETSI TS 143 022 V.8.1.0 in case of a GSM network, ETSI TS 125304 V8.3.0 in case of a 3G network or ETSI TS 136 304 V.8.3.0 in case of a LTE network. Those standards are incorporated by reference in the present description.

Once the cell has been selected, and the telephone has locked onto this selected cell (step 18), a radio link may be established with the network so as to notably allow the establishment of telephone communications or of multimedia data exchanges for example.

In any case, the set of parameters relating to the cell selected for the country in question will be stored in the non-volatile memory of the device (step 19) prior to the power down of the device.

This will allow the database of parameters PRMi stored in the memory NVM to be updated. This storage in memory or updating is preferably carried out as soon as a first cell has been selected, in other words considered as "correct" from the protocol point of view, so as to allow access to all the services and not only to the emergency numbers.

This storage in memory for the purposes of updating differs from the storage, specified in the standard, of the last cell found and carried out upon a request for power down of the telephone (step 21) just before the telephone returns to its off state, which will allow, where required, a conventional cell selection such as mentioned hereinabove.

Referring again now to FIG. 2, in which three cells CEL1, CEL2 and CEL3 are shown by way of example which continuously transmit their information over the transmission channel CH, it can be seen that the reception of the information from the various cells, notably their identifier and consequently the country code CC, are received via the antenna ANT of the telephone and transmitted after processing in a conventional analogue radiofrequency stage of a telephone, to the digital stage ETN of this telephone.

This stage ETN conventionally comprises a baseband processor PROC. The digital stage also comprises in the example described here the non-volatile memory NVM, which can also be situated in the SIM card of the telephone.

In practice, the various means allowing the implementation of the method that has just described with reference to FIG. 1 can take the form of software code within the processor PROC.

Thus, these various means comprise comparison means MCOMP configured for comparing the current country code CC with the country code LCC, selection means MSEL1 configured for selecting a cell of the network using, as a first priority, the set or sets of parameters PRMi stored in the memory NVM, and search means capable to be activated and configured for searching in the storage means the possible presence of the set or sets of parameters PRMi.

In addition, control means MCTL are configured for activating the search means if the result of the comparison is positive and for activating the selection means MSEL1.

Furthermore, additional selection means MSEL2, conventional and known per se, are provided implementing a conventional cell search algorithm in the case where the activation of the selection means MSEL1 does not result in the selection of a cell.

The invention claimed is:

1. A method for selecting a cell from a network when a wireless communications device is turned on, following a previous power down and saving of at least one set of parameters;

comprising a process for obtaining a current country code corresponding to a current location where said device is situated when it is switched on;

and, if a country code corresponding to said current location is different from a current country code corresponding to a place where said device was located during the previous power down;

then performing a search for a possible presence of the at least one set of parameters stored in said device associated with the current country code and relating to a cellular environment having already allowed a network access;

and, in an eventuality of such a presence, activating a selection of the cell using the at least one set of parameters as a first priority.

2. The method according to claim 1, also comprising the storage in said device of a set of parameters relating to the said cell selected prior to said power down of said device.

3. The method according to claim 1, in which said selection of said cell comprises the use of a conventional cell search algorithm if the said current country code is identical to said country code corresponding to said place where said device was located during the said previous power down or if said use of the stored set or sets of parameters has not allowed the said cell to be selected.

4. A wireless communications device, comprising:
   reception means configured for receiving a current country code corresponding to a current place where said device is located when it is turned back on following a previous power down,
   storage means configured for storing at least one set of parameters during previous power down, and associated with said current country code and relating to a cellular environment having already allowed a network access,
   search means capable of being activated and configured for searching in the storage means for a possible presence of at least one set of parameters,
   comparison means configured for comparing said current country code with a country code corresponding to a place where said device was located during the previous power down,
   selection means configured for selecting a cell from a network using, as a first priority, the at least one set of parameters, and
   control means configured for activating the search means if a result of the said comparison is positive and for activating the selection means.

5. The device according to claim 4, in which said control means are also configured for storing in said storage means a set of parameters relating to the said cell selected prior to said power down of said device.

6. The device according to claim 4, also comprising additional selection means capable of being to be activated and configured for selecting a cell with a conventional cell search algorithm, and said control means are configured for activating said additional selection means if a result of the said comparison is negative or if the activation of said selection means has not allowed the said cell to be selected.

* * * * *